(12) United States Patent
Jaradi et al.

(10) Patent No.: US 11,654,846 B1
(45) Date of Patent: May 23, 2023

(54) THERMOPLASTIC ELASTOMER WHEEL DEFLECTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 17/516,968

(22) Filed: Nov. 2, 2021

(51) Int. Cl.
*B60R 19/00* (2006.01)
*B62D 21/15* (2006.01)
*B60R 21/00* (2006.01)

(52) U.S. Cl.
CPC ............ *B60R 19/00* (2013.01); *B62D 21/152* (2013.01); *B60R 2019/002* (2013.01); *B60R 2019/007* (2013.01); *B60R 2021/0023* (2013.01)

(58) Field of Classification Search
CPC ............ B60R 2019/007; B60R 19/205; B60R 2019/002; B60R 2021/0023; B62D 21/152; B62D 25/025
See application file for complete search history.

(56) References Cited

U.S. PATENT DOCUMENTS

| | | | |
|---|---|---|---|
| 6,364,358 B1 | 4/2002 | Miller | |
| 6,460,889 B2 | 10/2002 | Iyanagi et al. | |
| 6,883,631 B2 | 4/2005 | Hu et al. | |
| 8,827,356 B2 | 9/2014 | Baccouche et al. | |
| 8,985,258 B1 | 3/2015 | Midoun et al. | |
| 9,004,216 B1* | 4/2015 | Baccouche | B60R 21/0136 180/274 |
| 9,394,005 B1* | 7/2016 | Enders | B60R 19/00 |
| 9,669,784 B2* | 6/2017 | Jensen | B62D 21/152 |
| 9,731,673 B2* | 8/2017 | Le | B60R 21/26 |
| 9,821,852 B2 | 11/2017 | Akhlaque-e-Rasul et al. | |
| 10,065,586 B2* | 9/2018 | Barbat | B60R 19/00 |
| 2014/0339782 A1* | 11/2014 | Asjad | B62D 21/155 280/124.125 |
| 2015/0101877 A1* | 4/2015 | Ohmura | B60R 21/206 180/274 |
| 2018/0141511 A1* | 5/2018 | Barbat | B62D 21/152 |

FOREIGN PATENT DOCUMENTS

| | | |
|---|---|---|
| EP | 3456610 A1 | 3/2019 |
| GB | 2482002 A | 1/2012 |
| GB | 2521761 A | 7/2015 |
| JP | 2005255010 A | 9/2005 |
| SE | 1300131 A1 | 8/2014 |

* cited by examiner

*Primary Examiner* — Paul N Dickson
*Assistant Examiner* — Matthew D Lee
(74) *Attorney, Agent, or Firm* — Frank A. MacKenzie; Bejin Bieneman PLC (57) ABSTRACT

A vehicle includes a vehicle body defining a front wheel well. The vehicle includes an inflatable device that is a thermoplastic elastomer. The inflatable device is inflatable from an undeployed position to a deployed position. The vehicle body defines a cavity and the inflatable device has a forward chamber and a rearward chamber disposed in the cavity in the undeployed position. The forward chamber expands vehicle-forward from the vehicle body into the wheel well from the undeployed position to the deployed position. The rearward chamber expands vehicle-rearward along the cavity from the undeployed position to the deployed position.

20 Claims, 10 Drawing Sheets

THERMOPLASTIC ELASTOMER WHEEL DEFLECTOR

BACKGROUND

During an offset frontal impact of a vehicle, a direction of the impact is offset from major structural components of the vehicle. Offset front impacts can be simulated with a small offset rigid barrier (SORB) frontal crash test. For example, the Insurance Institute for Highway Safety (IIHS) sets a standard for a SORB frontal crash test in which the vehicle impacts a rigid barrier at 40 miles/hour with 25% of an outer portion of the vehicle overlapping the rigid barrier.

In this frontal offset impact mode, various suspension and steering components will move relative to one another as deformation progresses in crash.

DETAILED DESCRIPTION

Figure 1:
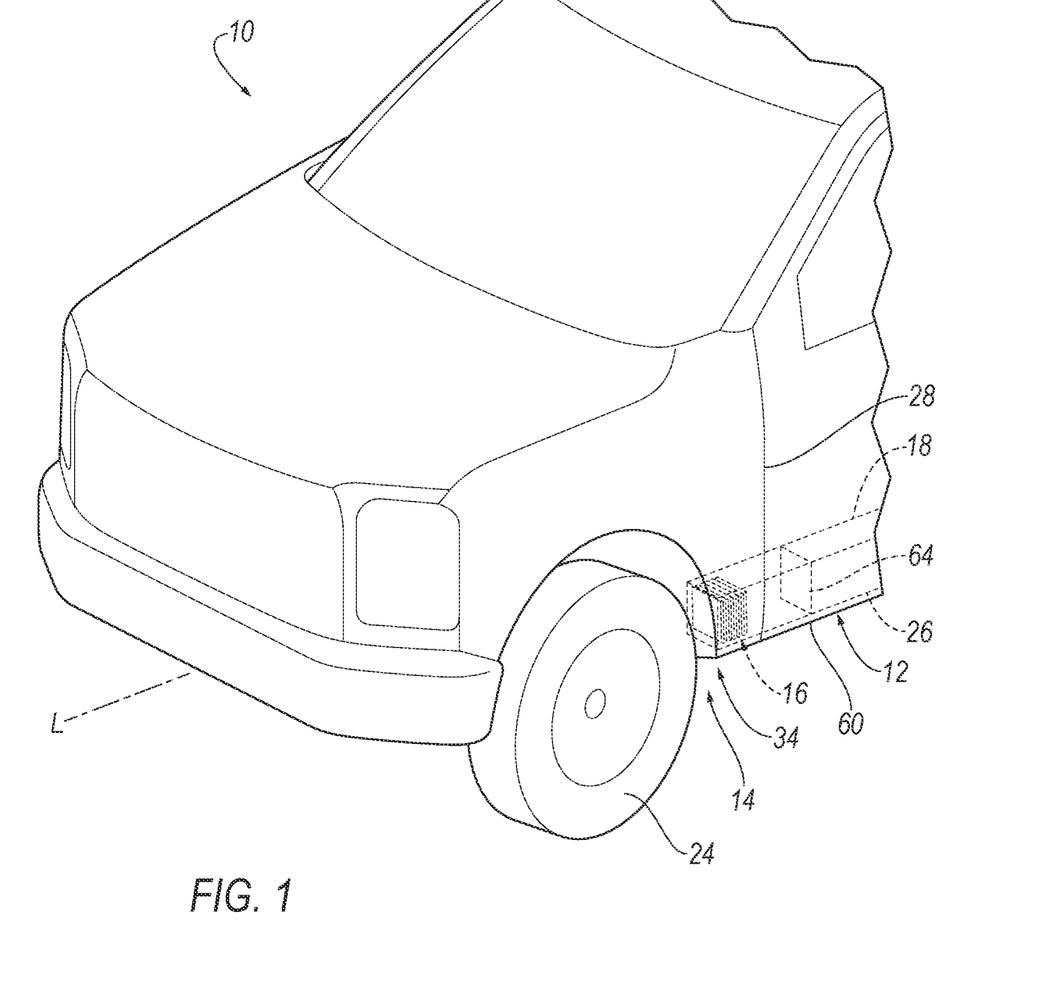
FIG. 1 is a perspective view of a vehicle having a vehicle body including a rocker and an inflatable device in the rocker in an undeployed position.
Figure 2:
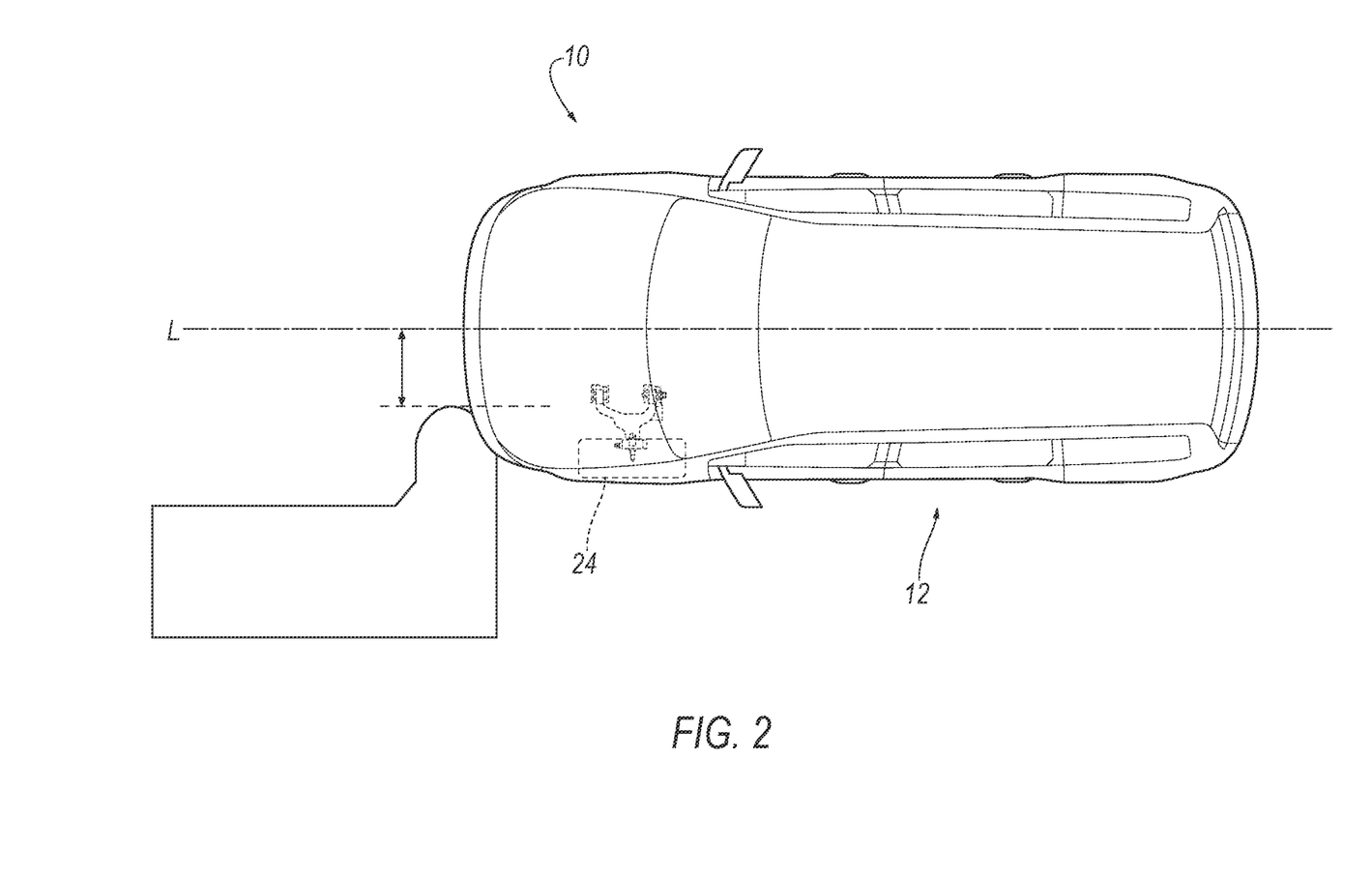
FIG. 2 is a perspective view of the vehicle during a small-offset rigid-barrier test.
Figure 3:
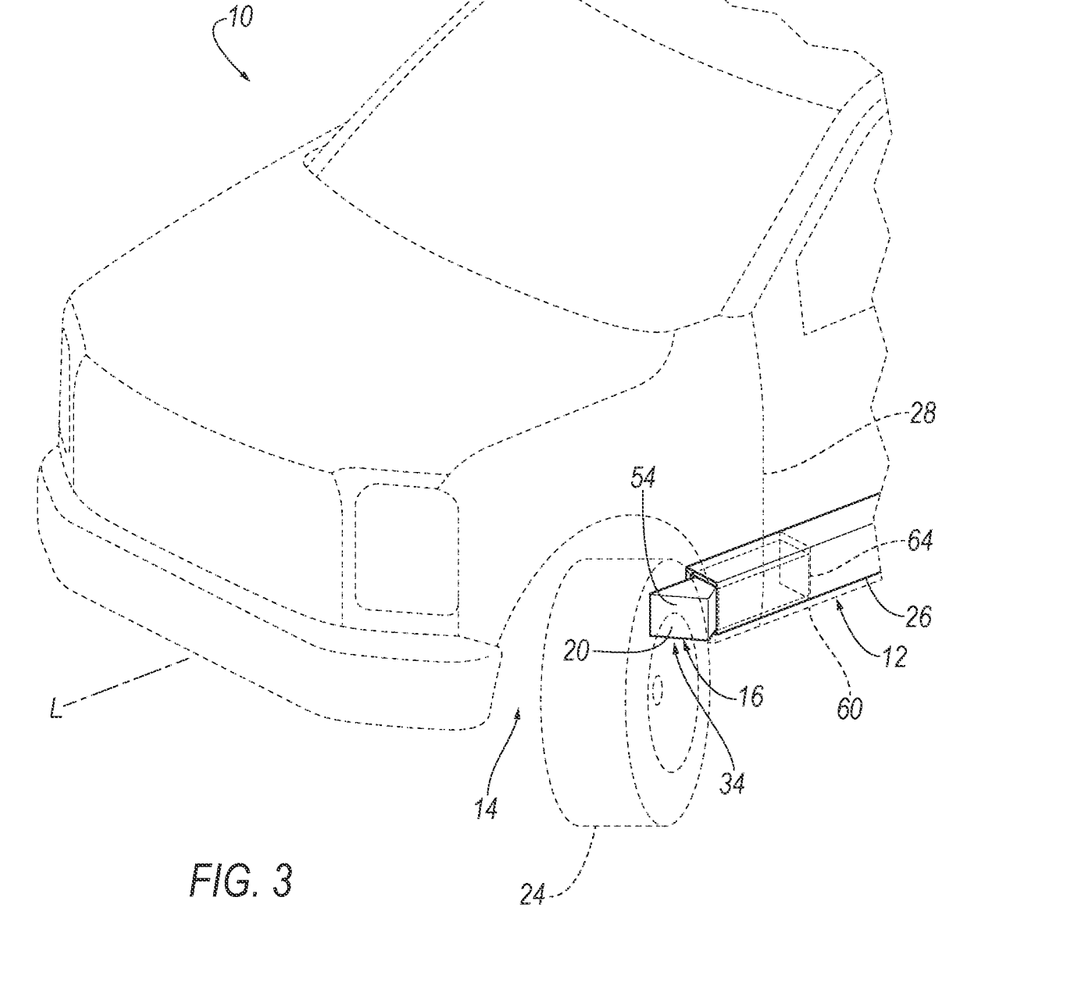
FIG. 3 is a perspective view of the vehicle in a deployed position.
Figure 4:
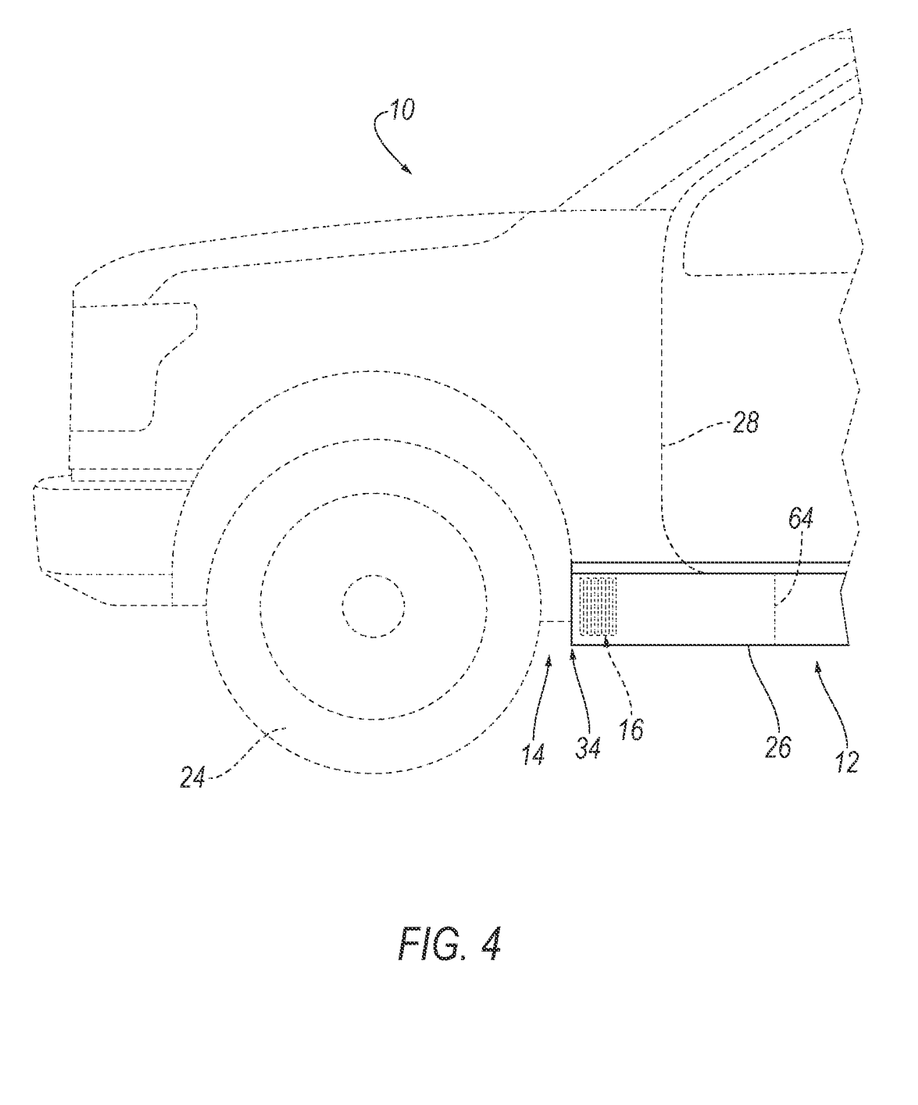
FIG. 4 is a side view of the vehicle with the inflatable device in the undeployed position.
Figure 5:
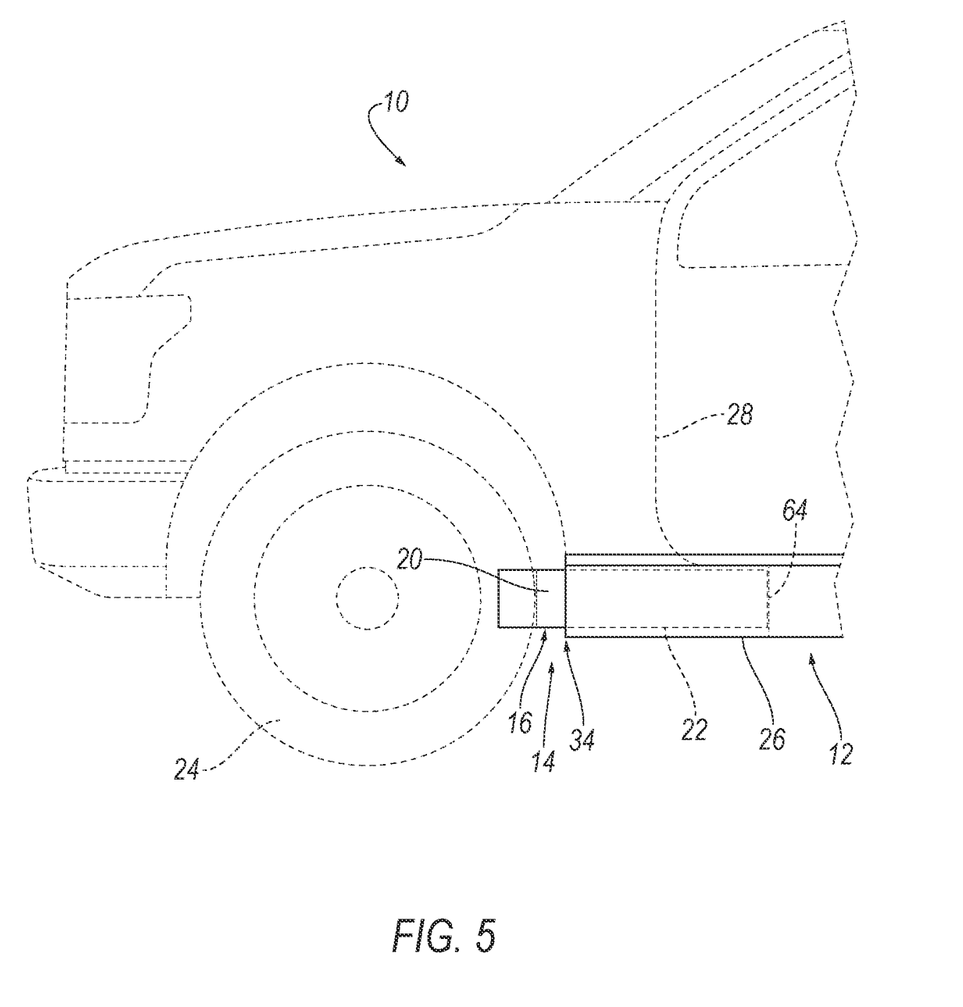
FIG. 5 is a side view of the vehicle with the inflatable device in the deployed position.

With reference to the Figures, wherein like numerals indicate like parts throughout the several views, a vehicle 10 includes a vehicle body 12 defining a front wheel well 14. The vehicle 10 includes an inflatable device 16 that is a thermoplastic elastomer. The inflatable device 16 is inflatable from an undeployed position (FIGS. 1, 4, 8) to a deployed position (FIGS. 3, 5, 6, and 9-10). The vehicle body 12 defines a cavity 18 and the inflatable device 16 has a forward chamber 20 and a rearward chamber 22 disposed in the cavity 18 in the undeployed position. The forward chamber 20 expands vehicle-forward from the vehicle body 12 into the front wheel well 14 from the undeployed position to the deployed position. The rearward chamber 22 expands vehicle-rearward along the cavity 18 from the undeployed position to the deployed position.

During a frontal impact of the vehicle 10, e.g., a small-offset rigid-barrier (SORB) frontal crash test, the inflatable device 16 moves to the deployed position, which deflects a vehicle-rearward end of a wheel 24 of the vehicle outboard, i.e., cross-vehicle away from the front wheel well 14. In other words, the inflatable device 16 operates as a wheel deflector. Specifically, the forward chamber 20 expands vehicle-forward into the front wheel well 14 to deflect the wheel 24. Since the rearward chamber 22 expands vehicle-rearward along the cavity 18 from the undeployed position to the deployed position, the rearward chamber 22 reinforces the vehicle body 12 in the area of the rearward chamber 22 and distributes forces along the rocker 26 that are generated by impact of the wheel 24 with the forward chamber 20 and/or the vehicle body 12 during a SORB frontal impact. For example, in the example described below, the vehicle body 12 may include a bulkhead 64 fixed to the rocker 26 along the cavity 18. In such an example, the rearward chamber 22 may impact the bulkhead 64 in the deployed position and transfer forces from the wheel 24 impacting the forward chamber 20 to the rocker 26. In other words, the bulkhead 64 operates as a backup surface for the rearward chamber during a vehicle-frontal impact, e.g., a SORB frontal impact.

The vehicle body 12 may be of a unibody construction in which a vehicle frame is unitary with the vehicle body 12 (including rockers 26, pillars 28, roof rails, etc.), as shown in the example in the figures. Details of the unibody construction are shown, in particular, in FIG. 7). As another example, the vehicle body 12 and vehicle frame may have a body-on-frame construction (also referred to as a cab-on-frame construction) in which the vehicle body 12 and vehicle frame are separate components, i.e., are modular, and the vehicle body 12 is supported on and affixed to the vehicle frame. Alternatively, the vehicle frame and vehicle body 12 may have any suitable construction. The vehicle frame and vehicle body 12 may be of any suitable material, for example, steel, aluminum, and/or fiber-reinforced plastic, etc.

Figure 6:
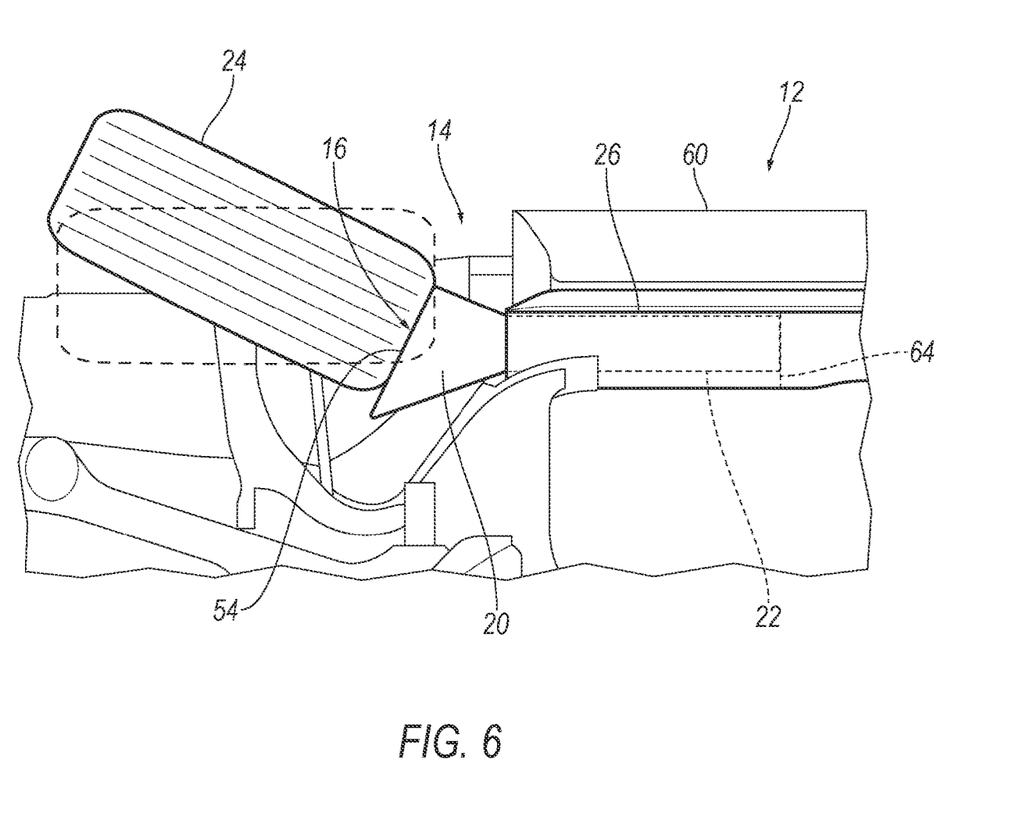
FIG. 6 is a bottom view of the vehicle with the inflatable device in the deployed position.

With reference to FIGS. 1-6, the vehicle body 12 may include the rockers 26, as introduced above. The rocker 26 may be at the lower-most and outer-most portion of the vehicle body 12, as shown in the example in the figures. The rocker 26 is elongated from one front wheel 24 to one rear wheel 24, as shown in FIG. 6. Specifically, the rocker 26 is elongated along a vehicle-longitudinal axis L.

Figure 7:
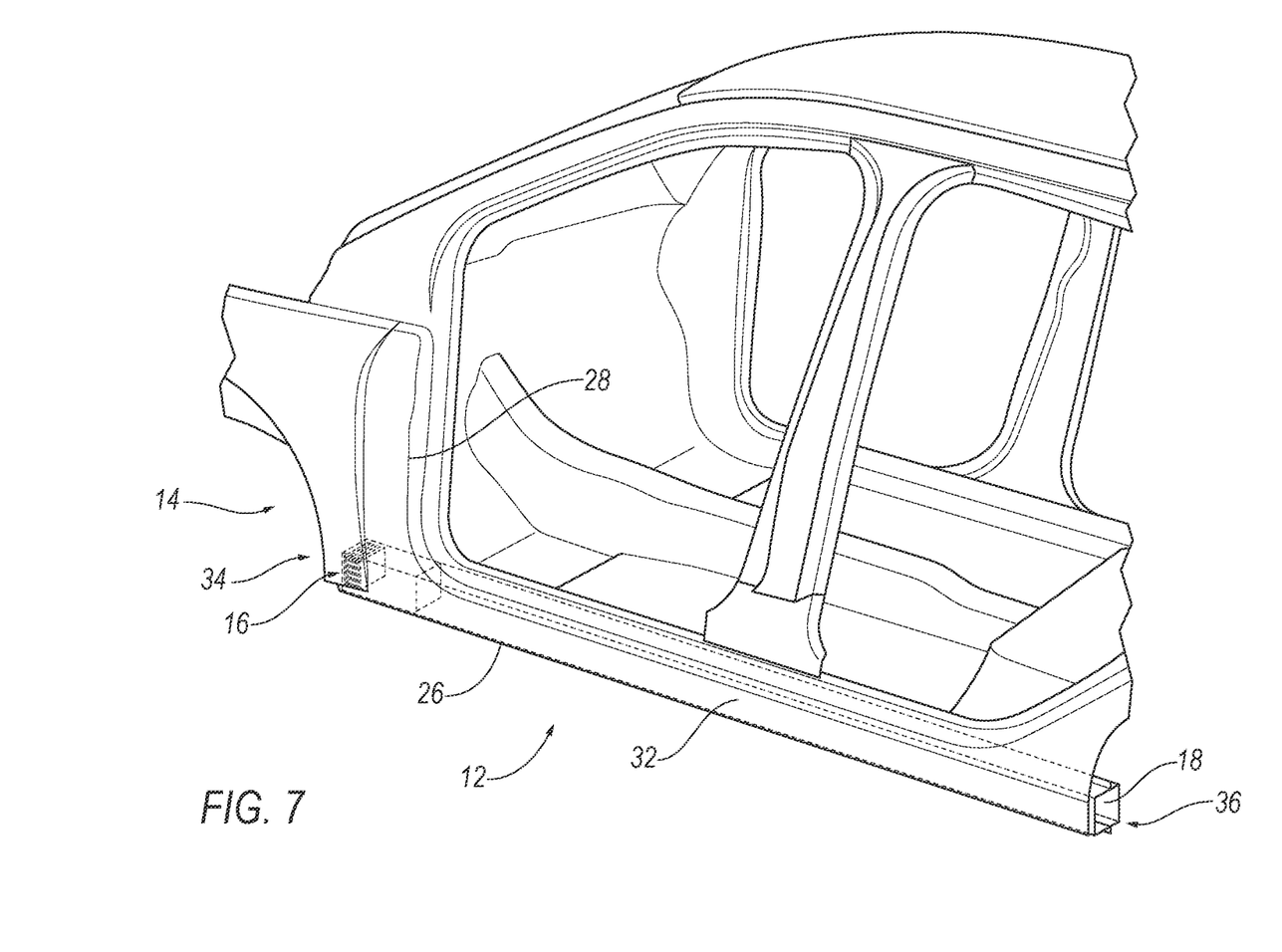
FIG. 7 is a perspective view of a portion of the vehicle body and the inflatable device.
Figure 10:
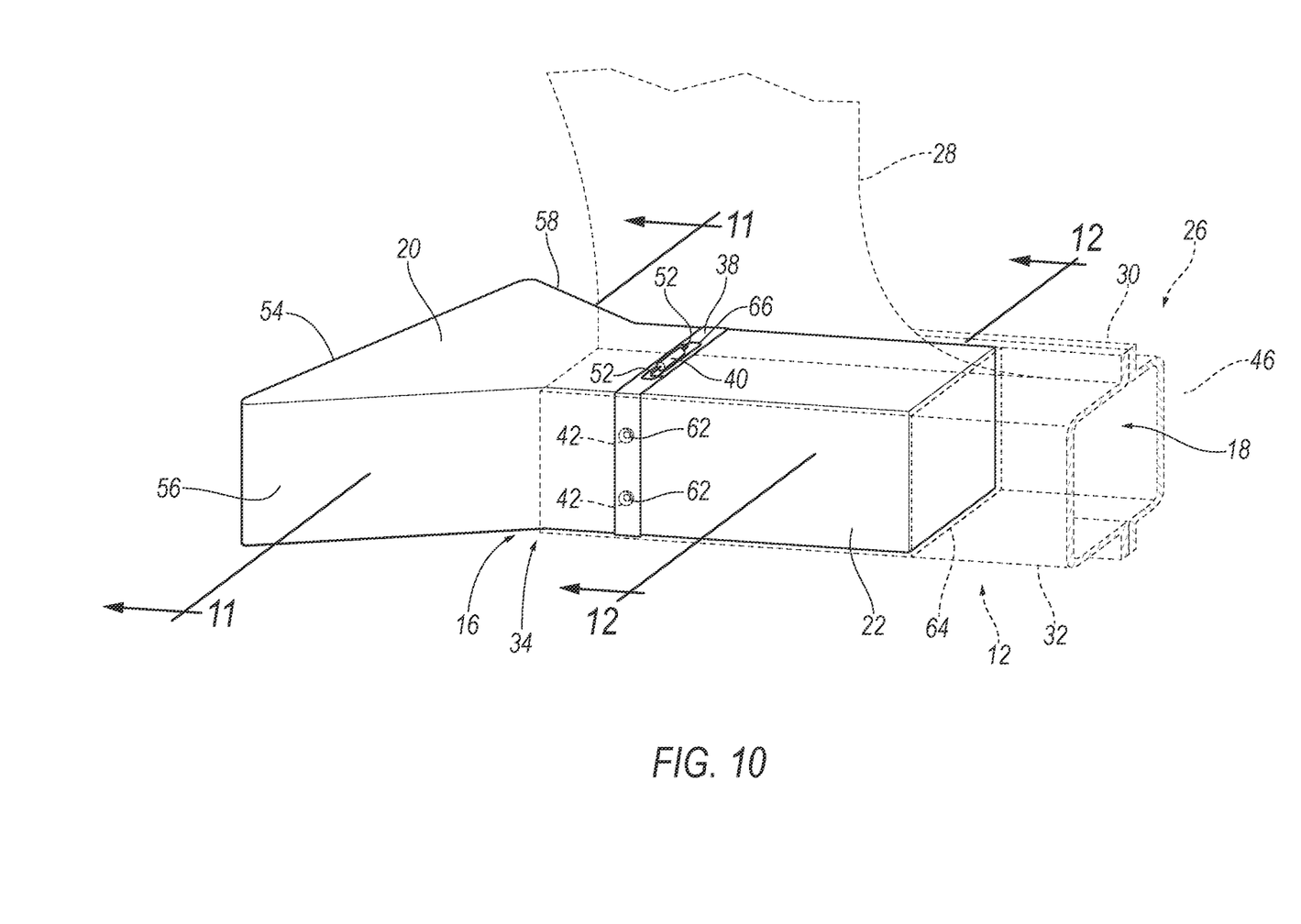
FIG. 10 is a perspective view of the rocker with the inflatable device in the deployed position.

The rocker 26 may include an inner rocker panel 30 and an outer rocker panel 32, as shown in FIG. 10. The inner rocker panel 30 is inboard of the outer rocker panel 32. In such an example, the inner rocker panel 30 and the outer rocker panel 32 may be elongated along the vehicle-longitudinal axis L and may define the cavity 18 therebetween. In such an example, the inflatable device 16 is disposed between the inner rocker panel 30 and the outer rocker panel 32. The inner rocker panel 30 and the outer rocker panel 32 may be fixed to each other along the vehicle-longitudinal axis L, e.g., welded to each other along flanges that are elongated along the vehicle-longitudinal axis L as shown in FIGS. 7 and 10. The rocker 26 may be hollow from a front end 34 of the rocker 26 to the rear end 36 of the rocker 26, e.g., the cavity 18 may extend from the front end 34 of the rocker 26 to the rear end 36 of the rocker 26. In such an example, the cavity 18 is elongated along the vehicle-longitudinal axis L from the front end 34 of the rocker 26 to the rear end 36 of the rocker 26. The front end 34 of the rocker 26 is vehicle-forward of the rear end 36 of the rocker 26. The rocker 26 may include an applique 60, i.e., a covering, that faces outboard and provides a class-A surface, i.e., a finished surface exposed to view by a customer and free of unaesthetic blemishes and defects.

As described above, the vehicle body 12 may include the bulkhead 64. Specifically, in such an example, the bulkhead 64 is spaced along the vehicle-longitudinal axis L vehicle-rearward from the rearward chamber 22 in the undeployed position. In such an example, the rearward chamber 22 may impact the bulkhead 64 in the deployed position and transfer forces from the wheel 24 impacting the forward chamber 20 to the rocker 26. The bulkhead 64 is positioned to be in contact with the rearward chamber in the deployed position. The bulkhead 64 is fixed to the rocker 26 along the cavity 18, e.g., by welding, fasteners, etc. The bulkhead 64 may be the same type of material as the rocker 40, e.g., steel, aluminum, and/or fiber-reinforced plastic, etc.

With reference to FIGS. 1-6, the vehicle body 12 defines the front wheel well 14. The front wheel well 14 is a void occupied by the wheel 24 of the vehicle 10. The vehicle 10 may include body panels, cladding, etc., lining the wheel well 14. The front end 34 of the rocker 26 is at the wheel well 14 and may be directly exposed to the front wheel well 14 or may be concealed by cladding or the like. The vehicle 10, specifically, includes two front wheel wells 14, i.e., a left-front wheel well 14 and a right-front wheel well 14, that house front wheels 24 of the vehicle 10 and two rear wheel wells 14 that house rear wheels 24 of the vehicle 10. In the example shown in the figures, one inflatable device 16 is at the left-front wheel well 14. In other examples, one inflatable device 16 may be at the right-front wheel well 14 in addition to or in the alternative to the inflatable device 16 at the left-front wheel well 14.

As set forth above, the vehicle body 12 defines the cavity 18 in which the inflatable device 16 is disposed. The cavity 18 may be proximate to the front wheel well 14 at a vehicle-rearward side of the front wheel well 14. The cavity 18 defined by a panel adjacent the front wheel well 14. In the example shown in the figures and as described above, the cavity 18 may be defined by the rocker 26, e.g., the inner rocker panel 30 and the outer rocker panel 32. In such an example, the cavity 18 is at the front end 34 of the rocker 26 and, in some examples, may extend continuously from the front end 34 of the rocker 26 to the rear end 36 of the rocker 26.

Figure 8:
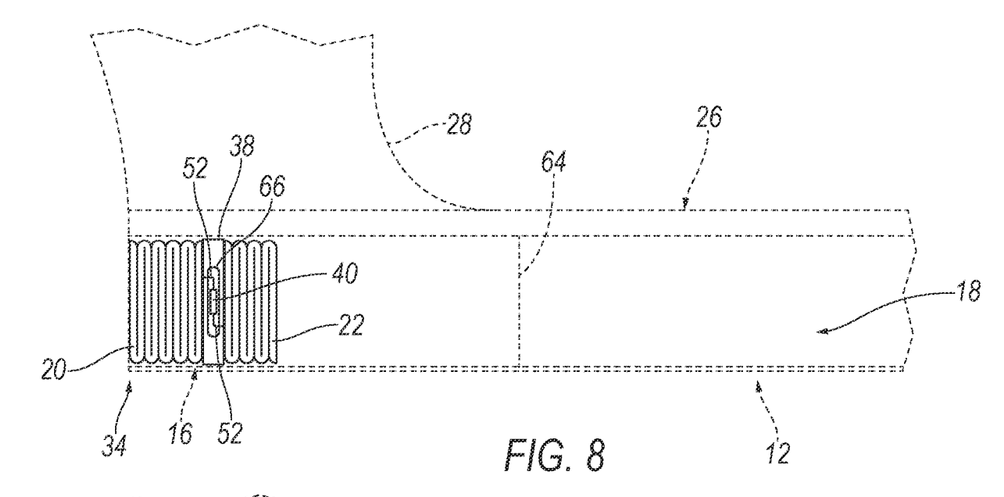
FIG. 8 is a side view of the rocker with the inflatable device in the undeployed position.
Figure 9:
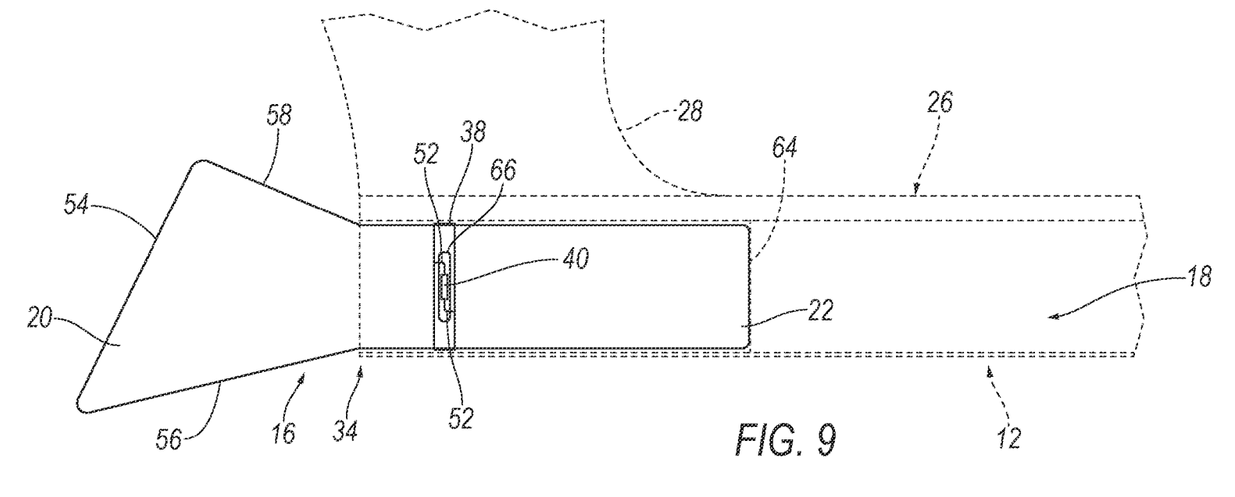
FIG. 9 is a side view of the rocker with the inflatable device in the deployed position.

With reference to FIGS. 7-9, the inflatable device 16 includes the forward chamber 20 and the rearward chamber 22. The inflatable device 16 may include a divider 38 between the forward chamber 20 and the rearward chamber 22. The divider 38 may fluidly separate the forward chamber 20 and the rearward chamber 22. In other words, in such an example, the divider 38 prevents fluid flow through the divider 38 between the forward chamber 20 and the rearward chamber 22. The forward chamber 20 and the rearward chamber 22 may be fluidly isolated from each other. In such an example the forward chamber 20 and the rearward chamber 22 are independently inflated, e.g., by separate fill tubes 52 from a common inflator 40 or by separate inflators 40, as described further below.

The divider 38 may be block-shaped. In the example shown in the figures, the divider 38 is a rectangular cuboid. The divider 38 provides a reaction surface for the forward chamber 20 and the rearward chamber 22 during deployment of the forward chamber 20 and the rearward chamber 22 from the undeployed position to the deployed position. In other words, the divider 38 grounds the forward chamber 20 and the rearward chamber 22 to the vehicle body 12, e.g., the rocker 26, so that the forward chamber 20 and the rearward chamber 22 move relative to the divider 38 as the forward chamber 20 and the rearward chamber 22 move from the undeployed position to the deployed position. The divider 38 may be rigid relative to the forward chamber 20 and the rearward chamber 22, e.g., by way of the material thickness of the divider 38 being greater than the material thickness of the forward chamber 20 and the rearward chamber 22. The divider 38 may prevent contact between the forward chamber 20 and the rearward chamber 22 in both the undeployed position and the deployed position, as shown in FIGS. 8-10. In such an example, the divider 38 may be vehicle-rearward of the entire forward chamber 20 and the divider 38 may be vehicle-forward of the entire rearward chamber 22.

The forward chamber 20, the rearward chamber 22, and the divider 38 may be unitary, i.e., a single piece of material of uniform material type with no seams, joints, fasteners 42, or adhesives holding it together. Specifically, when unitary, the forward chamber 20, the rearward chamber 22, and the divider 38 are formed together simultaneously as a single continuous unit, e.g., by injection molding, blow molding, etc. Non-unitary components, in contrast, are formed separately and subsequently assembled, e.g., by threaded engagement, fusing, welding, adhesive, etc. In other examples in the alternative to being unitary, the forward chamber 20, rearward chamber 22, and divider 38 are formed separately, e.g., individually molded, and subsequently connected together, e.g., by welding, fusing, adhesive, etc.

As set forth above, the inflatable device 16 may be thermoplastic elastomer (TPE). Specifically, the forward chamber 20 and the rearward chamber 22 may be thermoplastic elastomer. In addition, in some examples, the divider 38 is thermoplastic elastomer. In such an example, the forward chamber 20, the rearward chamber 22, and the divider 38 may be the same type of thermoplastic elastomer. In such an example, the forward chamber 20, the rearward chamber 22, and the divider 38 may be unitary, as described above. The thermoplastic elastomer is a polymeric material with both thermoplastic and elastomeric properties. A suitable class of TPE material may be, for example, thermoplastic olefin (TPO). Types of TPEs include styrenic block copolymers, thermoplastic olefins, elastomeric alloys, thermoplastic polyurethanes, thermoplastic copolyesters, and thermoplastic polyamides. The thermoplastic elastomer may be, for example, polypropylene (PP), polyethylene (PE) etc.

The properties of the thermoplastic elastomer allows the forward chamber 20 and the rearward chamber 22 to be folded in the cavity 18 in the undeployed position and to unfold from the undeployed position to the deployed position. The thermoplastic elastomer forms walls 44 of the inflatable device 16 that are solid, not woven, fabric, etc. The thermoplastic elastomer may be 1-4 millimeters thick. The thickness of the walls 44 of the forward chamber 20 and the rearward chamber 22 formed by the thermoplastic elastomer may be the same in the undeployed position and the deployed position, i.e., the walls 44 do not stretch to be thinner in the deployed position. The manufacturing flexibility afforded by the thermoplastic material allows the inflatable device 16 to be formed, e.g., blow molded, injection molded, etc., into any suitable shape, size, and thickness. The inflatable device 16 being a thermoplastic elastomer aids in the deployment characteristics and the shape and size of the inflatable device 16 in the deployed position. The inflatable device 16 being a thermoplastic elastomer may aid in packaging of the inflatable device 16, as described further below.

The inflatable device 16 is fixed to the vehicle body 12, e.g., to the rocker 26. Specifically, the divider 38 may be fixed to the vehicle body 12, e.g., to the rocker 26. The divider 38 may support forward chamber 20 and the rearward chamber 22 on the vehicle body 12, i.e., the divider 38 may be directly attached to the vehicle body 12 and the forward chamber 20 and the rearward chamber 22 may be attached to the vehicle body 12 through the divider 38.

The divider 38 may be fixed to the vehicle body 12 with one or more fasteners 42. Specifically, the fastener 42 may extend through a wall 46 of the vehicle body 12, e.g., the rocker 26, and threadedly engage the inflatable device 16. In some examples, including the example shown in the figures, the fastener 42 extends through the wall 46 of the vehicle body 12 and threadedly engages the divider 38. In such an example, the divider 38 include a threaded hole 62 that threadedly receive the fastener 42. In the example shown in FIG. 10, two fasteners 42 extend through one wall 46 of the rocker 26 and threadedly engages the divider 38. Any suitable number of fasteners 42 may extend through any one or more of the walls 46 of the vehicle body 12 to threadedly engage the inflatable device 16.

The inflatable device 16 includes at least one inflator 40. As set forth above, the inflatable device 16 may include one inflator 40 that inflates both the forward chamber 20 and the rearward chamber 22, as in the example shown in the figures. In such an example, the inflator 40 includes fill tubes 52 in communication with the forward chamber 20 and the rearward chamber 22 to deliver inflation medium to the forward chamber 20 the rearward chamber 22. As another example, the inflatable device 16 may include two inflators 40, specifically, one inflator 40 dedicated to the forward chamber 20 and one inflator 40 dedicated to the rearward inflator 40.

In the example shown in the figures, the inflator 40 is supported on the divider 38. For example, the inflator 40 may be fixed to the divider 38, e.g., with fasteners 42 such as threaded fasteners 42 that threadedly engage the divider 38. As an example, the wall 46 of the vehicle body 12, e.g., the rocker 26, defines a cutout 66 that extends through the wall 46. In such an example, the inflator 40 is disposed in the cutout 66. The divider 38 is aligned with the cutout 66 along the vehicle-longitudinal axis L, as shown in FIGS. 8-10.

The inflator 40 is in fluid communication with the forward chamber 20 and the rearward chamber 22. The inflator 40 expands the forward chamber 20 and the rearward chamber 22 with inflation medium, such as a gas, to move the forward chamber 20 and the rearward chamber 22 from the undeployed position to the deployed position. The inflator 40 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 40 may be, for example, at least partially in the inflation chamber 48, 50 to deliver inflation medium directly to the inflation chamber 48, 50 or may be connected to the inflation chamber 48, 50 through fill tubes 52.

Figure 11:
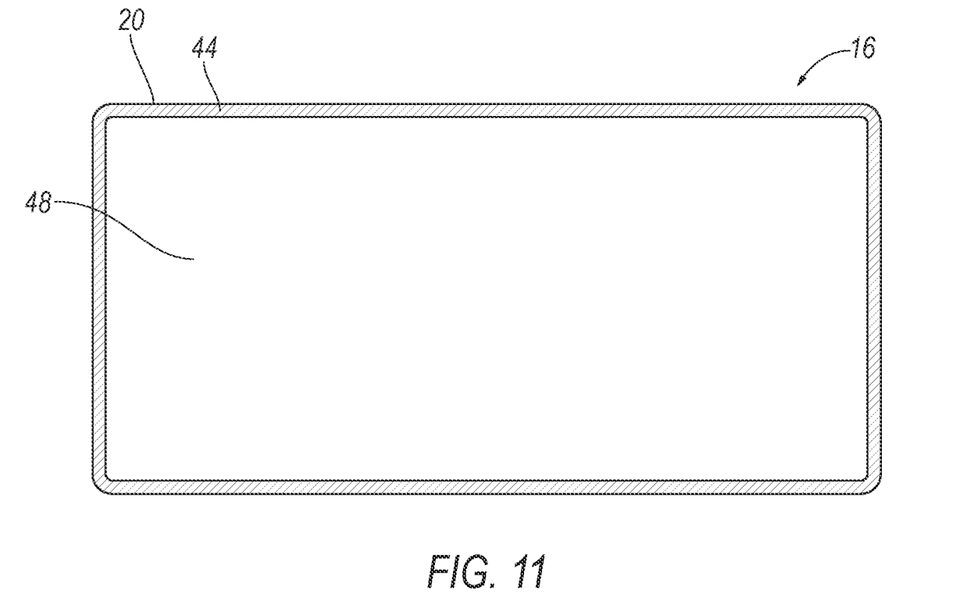
FIG. 11 is a cross-sectional view along line 11 in FIG. 10.
Figure 12:
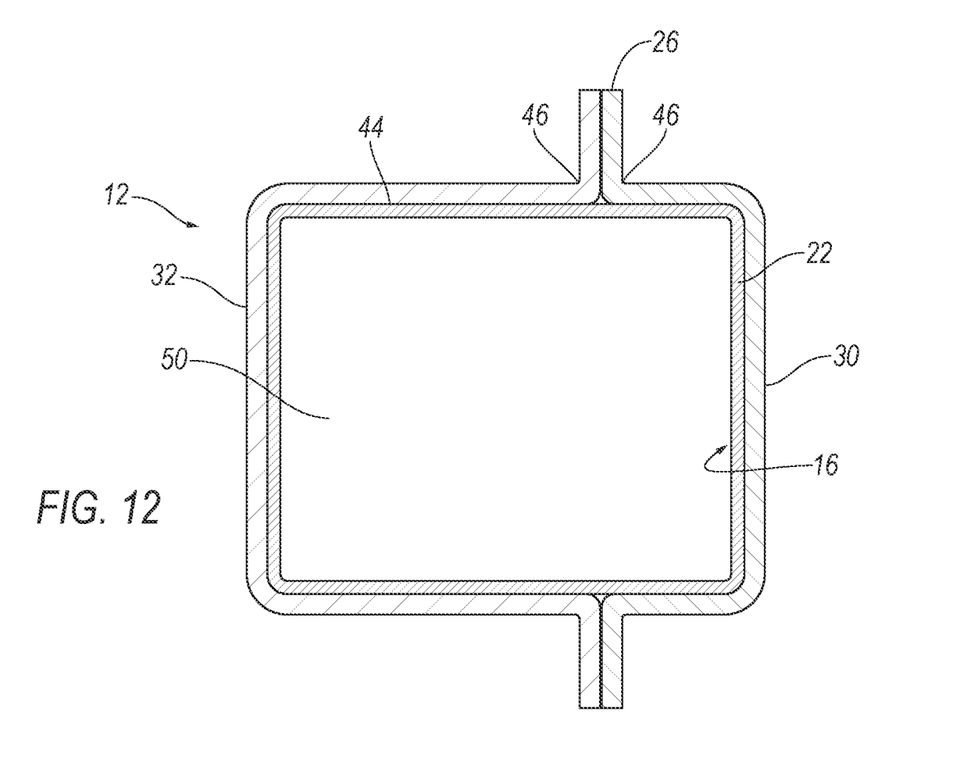
FIG. 12 is a cross-sectional view along line 12 in FIG. 10.

As set forth above, the inflatable device 16 is inflatable from an undeployed position to a deployed position. Specifically, the forward chamber 20 and the rearward chamber 22 are inflatable from the undeployed position to the deployed position. As shown in FIGS. 11 and 12, respectively, the forward chamber 20 includes an inflation chamber 48 and the rearward chamber 22 includes an inflation chamber 50. The inflation chambers 48, 50 are defined by the walls 44 of the forward chamber 20 and the rearward chamber 22. The inflation chambers 48, 50 are inflated with inflation medium from the inflator 40 to move the forward chamber 20 and the rearward chamber 22 from the undeployed position to the deployed position. The inflation chambers 48, 50 may be sealed, i.e., may not exhaust inflation medium during inflation, or the walls 44 of the forward chamber 20 and/or rearward chamber 22 may include vents (not shown) that allow for the inflation medium to be vented during inflation to tune the inflation and/or deployment from the undeployed position to the deployed position.

With reference to FIG. 8, the forward chamber 20 and the rearward chamber 22 may be folded in the cavity 18 in the undeployed position. Specifically, the forward chamber 20 and the rearward chamber 22 may be folded with accordion-like folds that unfold during deployment from the undeployed position to the deployed position. Alternatively, the forward chamber 20 and the rearward chamber 22 may be packaged in the cavity 18 in the undeployed position in any suitable fashion.

The forward chamber 20 expands vehicle-forward from the vehicle body 12 into the wheel well 14 from the undeployed position to the deployed position. Specifically, the forward chamber 20 extends toward the wheel 24 from the undeployed position to the deployed position. The forward chamber 20 may break through cladding or other components between the front end 34 of the rocker 26 and the front wheel well 14 as the forward chamber 20 deployed from the undeployed position to the deployed position.

In the deployed position, the forward chamber 20 deflects the vehicle-rearward end of the wheel 24 outboard, i.e., cross-vehicle away from the front wheel well 14. In other words, the forward chamber 20 operates as a wheel deflector. The forward chamber 20 is designed to deflect the wheel 24 outboard during vehicle frontal impact, such as a SORB frontal impact, that forces the wheel 24 vehicle-rearward and inboard. In other words, the forward chamber 20 is sized and shaped to move toward and impact the wheel 24 during such a vehicle 10 impact and withstands forces generated by impact with the wheel 24, e.g., with wall thickness of the wall 44 frontal chamber, inflation pressure, etc.

The size of the forward chamber 20 may expand in a vehicle-forward direction from the front end 34 of the rocker 26. In the example shown in the figures, the forward chamber 20 has a generally rectangular cross section that expands in the vehicle-forward direction. Specifically, the horizontal width of the forward chamber 20 may increase, as shown in the figures.

The forward chamber 20 has a vehicle-forward face 54 that may angle in a rearward and inboard direction. Specifically, the forward chamber 20 has an outboard side 56 and an inboard side 58 spaced cross-vehicle from the outboard side 56 with the vehicle-forward face 54 angling vehicle-rearward from the outboard side 56 to the inboard side 58. In such an example, the angle of the vehicle-forward face 54 deflects the vehicle-rearward end of the wheel 24 inboard during a vehicle-frontal impact such as a SORB frontal impact.

The rearward chamber 22 is disposed in the cavity 18 in the undeployed position and in the deployed position. Specifically, the rearward chamber 22 expands vehicle-rearward along the cavity 18 from the undeployed position to the deployed position. Since the rearward chamber 22 expands vehicle-rearward along the cavity 18 from the undeployed position to the deployed position, the rearward chamber 22 reinforces the vehicle body 12, e.g., the rocker 26, in the area of the rearward chamber 22 and distributes forces along the rocker 26 that are generated by impact of the wheel 24 with the forward chamber 20 and/or the vehicle body 12 during vehicle-frontal impact, e.g., a SORB frontal impact.

In examples including the bulkhead 64, the rearward chamber 22 is sized to contact the bulkhead in the deployed position. In such an example, the bulkhead 64 prevents rearward movement of the rearward chamber 22 rearward past the bulkhead 64 to reinforce the inflatable device 16 to deflect the wheel 24.

The rearward chamber 22 is designed to reinforce the vehicle body 12, e.g., the rocker 26 and to transmit force from the wheel 24 to the bulkhead 64. For example, the rearward chamber 22 may conform to the shape of the cavity 18 to reinforce the vehicle body 12, e.g., the rocker 26 during a vehicle-frontal impact, e.g., a SORB frontal impact. The rearward chamber 22 may be sized and shaped to reinforce the vehicle body 12, e.g., the rocker 26, during a vehicle-frontal impact, e.g., a SORB frontal impact, with wall thickness of the wall 44 of the rearward chamber 22, inflation pressure, etc. As described above, the rearward chamber 22 is sized to contact the bulkhead 64 in the deployed position.

The vehicle may include a control system including at least one impact sensor for sensing an impact of the vehicle, and a controller (e.g., a restraints control module) in communication with the sensor and the inflator 40 for activating the inflator 40, for example, by providing an impulse to a pyrotechnic charge of the inflator 40, when the impact sensor senses an impact of the vehicle 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a vehicle body defining a front wheel well;
an inflatable device that is a thermoplastic elastomer, the inflatable device being inflatable from an undeployed position to a deployed position;
the vehicle body defining a cavity and the inflatable device having a forward chamber and a rearward chamber disposed in the cavity in the undeployed position;
the forward chamber expanding vehicle-forward from the vehicle body into the wheel well from the undeployed position to the deployed position; and
the rearward chamber expanding vehicle-rearward along the cavity from the undeployed position to the deployed position.

2. The vehicle as set forth in claim 1, wherein the inflatable device is fixed to the vehicle body.

3. The vehicle as set forth in claim 1, further comprising a fastener extending through a wall of the vehicle body and engaging the inflatable device.

4. The vehicle as set forth in claim 1, wherein the vehicle body includes a rocker and the rocker defines the cavity.

5. The vehicle as set forth in claim 4, wherein the vehicle body includes a bulkhead fixed to the rocker in the cavity, the bulkhead being spaced vehicle-rearward of the rearward chamber in the undeployed position, and the bulkhead being positioned to be impacted by the rearward chamber to prevent movement of the rearward chamber vehicle-rearward of the bulkhead.

6. The vehicle as set forth in claim 1, wherein the vehicle body includes a rocker, the rocker having an inner rocker panel and an outer rocker panel, the inner rocker panel and the outer rocker panel defining the cavity.

7. The vehicle as set forth in claim 1, wherein the inflatable device includes a divider between forward chamber and the rearward chamber.

8. The vehicle as set forth in claim 7, wherein the divider is fixed to the vehicle body.

9. The vehicle as set forth in claim 8, further comprising an inflator supported on the divider.

10. The vehicle as set forth in claim 7, further comprising an inflator supported on the divider.

11. The vehicle as set forth in claim 10, wherein the vehicle body includes a rocker including a wall and a cutout through the wall, the inflator being disposed in the cutout.

12. The vehicle as set forth in claim 11, wherein the divider is aligned with the cutout along a vehicle-longitudinal axis.

13. The vehicle as set forth in claim 12, further comprising a fastener extending through the wall of the rocker and engaging the divider of the inflatable device.

14. The vehicle as set forth in claim 10, wherein the inflator includes fill tubes in communication with the forward chamber and the rearward chamber.

15. The vehicle as set forth in claim 7, further comprising a fastener extending through a wall of the vehicle body and engaging the divider of the inflatable device.

16. The vehicle as set forth in claim 7, wherein the divider fluidly separates the forward chamber and the rearward chamber.

17. The vehicle as set forth in claim 1, further comprising a vehicle wheel in the wheel well, the forward chamber extending toward the wheel from the undeployed position to the deployed position.

18. The vehicle as set forth in claim 1, wherein the forward chamber has an outboard side, an inboard side spaced cross-vehicle from the outboard side, and a vehicle-forward face, the vehicle forward face angling vehicle-rearward from the outboard side to the inboard side.

19. The vehicle as set forth in claim 1, wherein the cavity is elongated along a vehicle-longitudinal axis.

20. The vehicle as set forth in claim 1, wherein the vehicle body has a unibody construction.

* * * * *